Nov. 8, 1960 J. P. ECKERT, JR 2,959,770

SHIFTING REGISTER EMPLOYING MAGNETIC AMPLIFIERS

Filed May 21, 1954 3 Sheets-Sheet 1

INVENTOR
JOHN PRESPER ECKERT, JR.

BY

ATTORNEY

SHIFTING REGISTER EMPLOYING MAGNETIC AMPLIFIERS

Filed May 21, 1954 3 Sheets-Sheet 2

INVENTOR
JOHN PRESPER ECKERT, JR.
BY
[signature]
ATTORNEY

Nov. 8, 1960 J. P. ECKERT, JR 2,959,770

SHIFTING REGISTER EMPLOYING MAGNETIC AMPLIFIERS

Filed May 21, 1954 3 Sheets-Sheet 3

INVENTOR.
JOHN PRESPER ECKERT, JR.

BY

ATTORNEY

Patented Nov. 8, 1960

2,959,770

SHIFTING REGISTER EMPLOYING MAGNETIC AMPLIFIERS

John Presper Eckert, Jr., Philadelphia, Pa., assignor to Sperry Rand Corporation, a corporation of Delaware Filed May 21, 1954, Ser. No. 431,378

6 Claims. (Cl. 340—174)

This invention relates to shifting registers for computing circuits and more particularly to shifting registers employing magnetic amplifiers. One function of a shifting register in a computing circuit is described on page 297 et seq. of the text book "High Speed Computing Devices" by the Staff of Engineering Research Associates, Inc., published by McGraw-Hill Book Company (1950).

An object of this invention is to provide a shifting register that does not have any component parts that are liable to burn out.

Another object of this invention is to provide a shifting register that is low in cost.

An additional object of this invention is to provide a shifting register in which the component parts include magnetic amplifiers, whereby the advantage of that type of component is obtained.

Another object of this invention is to provide a shifting register that is very efficient and effective in operation.

Briefly speaking, the invention employs a plurality of complementing magnetic amplifiers connected in cascade. A triggering signal fed to the input of the first amplifier causes the entire series of amplifiers to successively change from one stable state to the other. The outputs of alternate amplifiers will have signals on them at a given time representative of a parallel output. If it is desired to employ the device as a converter from parallel to series operation, the parallel signals are fed to the inputs of alternate amplifiers and the serial signals appear in the output of the last amplifier.

Figure 2:
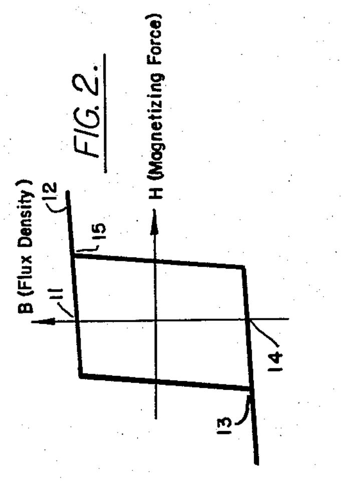
Figure 2 is a hysteresis loop of the material used for the cores of the magnetic amplifiers.
Figure 1:
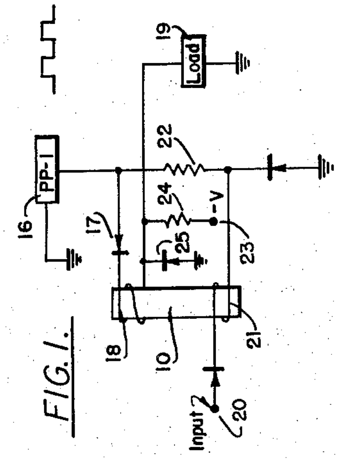
Figure 1 is a schematic diagram of a typical magnetic amplifier employed in connection with the invention.

Figure 1 is a schematic diagram of one type of magnetic amplifier that may be used in connection with the invention. The magnetic core 10 may be made of a variety of materials, among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 2). Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core in that the coils on the core exhibit low impedance. On the other hand, when the core is operating on the vertical (or unsaturated) portions of the hysteresis loop, the impedance of the coils on the core will be high.

The source 16, of power pulses PP–1, generates a train of equally spaced square wave pulses. If it be assumed that at the beginning of any given pulse the core has residual magnetism and flux density as represented by point 11 of the hysteresis loop of Figure 2, the power pulse will drive the core from point 11 to saturation point 12. At the conclusion of the pulse the magnetization will return to point 11. Successive pulses from power source 16 will flow through rectifier 17, coil 18 and load 19, repeatedly driving the core from remanence point 11 to saturation point 12. During the interval in which the core is being driven from 11 to 12, the core is operating on a relatively saturated portion of the hysteresis loop, whereby the impedance of coil 18 is low. Hence the power pulses will flow from source 16 to load 19 without substantial attenuation due to coil impedance. If, however, during the interval between two power pulses, a pulse is received at the input 20, it will pass through coil 21, resistor 22, source 16, to ground. This will magnetize the core negatively driving it from point 11 to point 13. At the conclusion of this pulse the core will return to remanence point 14. The next power pulse from source 16 is just sufficient to drive the core positively from point 14 to point 15. Since this is a relatively unsaturated portion of the hysteresis loop, the coil 18 will have high impedance during this pulse and the current flow will be very low and, therefore, substantially no output signal will be applied to the load 19. At the conclusion of that pulse the magnetization will return to zero value 11. If no signal appears on the input immediately following the last-named power pulse, the next power pulse will drive the core to saturation at point 12 and will give a large output at the load 19.

Consequently, it is clear that the magnetic amplifier of Figure 1 will feed large output pulses to the load 19 in response to each power pulse from source 16, with the exception of those power pulses applied to the coil 18 immediately after the receipt of a pulse on the input 20. This type of a magnetic amplifier is known as a "complementing" one.

In order to avoid appearance at the load 19 of the small current which flows during the period that a power pulse is driving the core from point 14 to point 15, the parts 23, 24 and 25 may be employed. The negative source 23 passes a current greater than said small current through resistor 24 and rectifier 25. Thus in the presence of the said small current, there is a net current in diode 25, and the cathode of 25 therefore remains substantially at ground potential.

Figure 3:
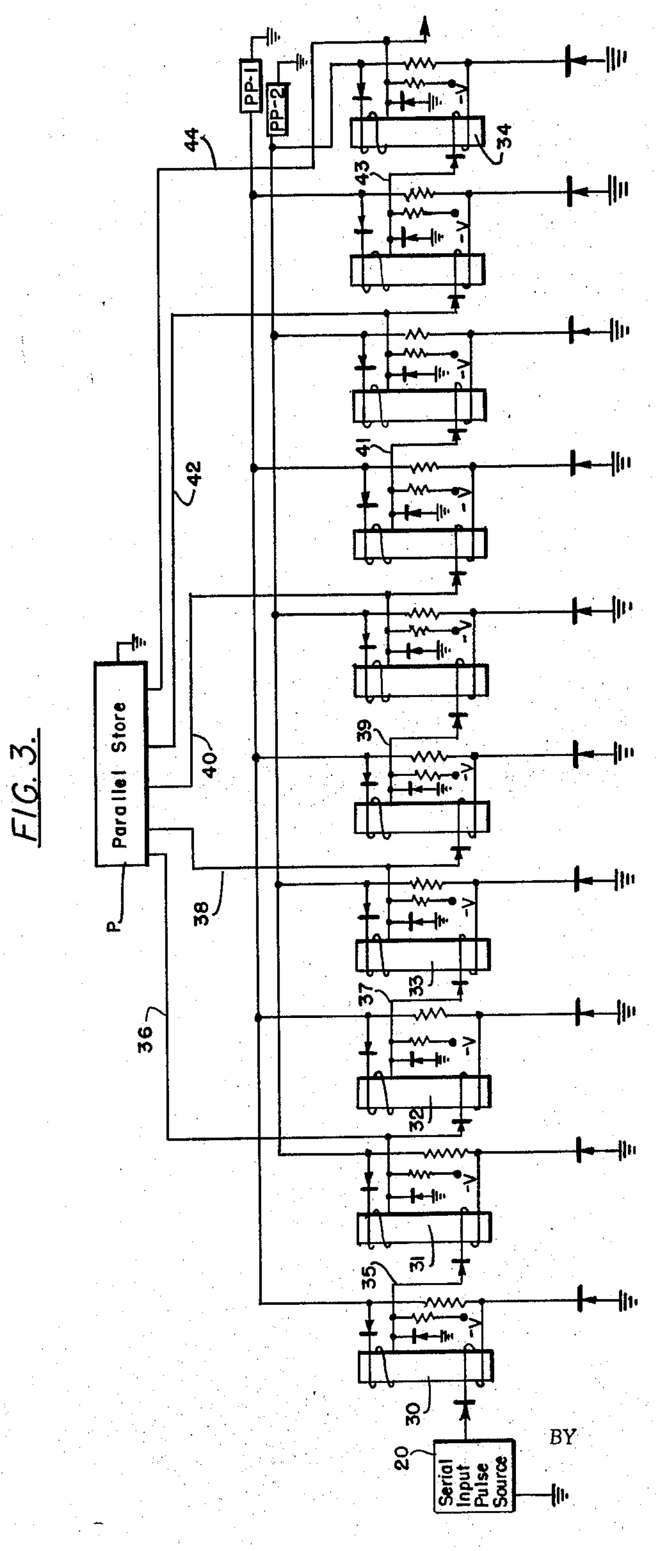
Figure 3 is a schematic diagram of a serial to parallel converter.
Figure 5:
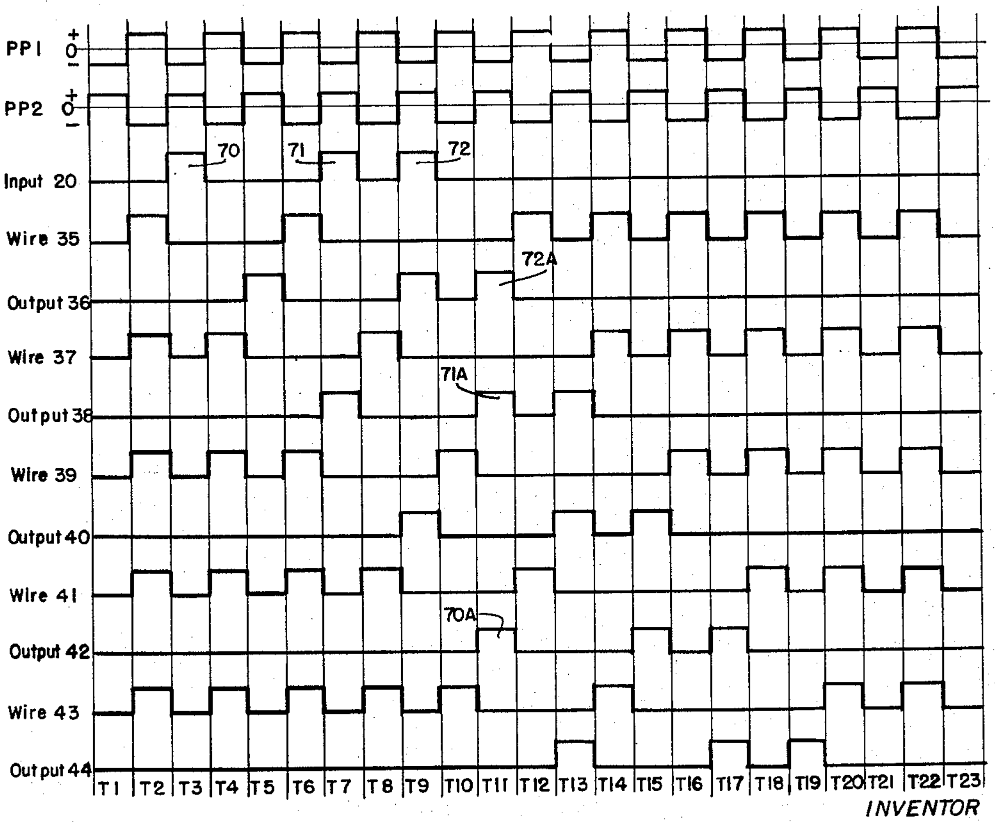
Figure 5 is a diagram illustrative of the waveforms and signals involved in the device of Figure 3.

Figure 3 illustrates a circuit employing the aforesaid amplifiers for the purpose of converting serial information into parallel information. The serial input 20 energizes the input of magnetic amplifier 30. The output of magnetic amplifier 30 energizes the input of magnetic amplifier 31. Similarly the output of magnetic amplifier 31 energizes the input of magnetic amplifier 32, etc. In other words, the magnetic amplifiers are connected in cascade. There are two sources of power pulses PP–1 and PP–2. The pulses from these sources may be equally spaced with the pulses of one source occurring during the intervals between the pulses of the other source, as shown in Figure 5. The power pulses from the first source PP–1 energize the odd numbered magnetic amplifiers and the pulses from the second source PP–2 energize the even numbered magnetic amplifiers. The outputs 36, 38, etc., of the even numbered magnetic amplifiers feed the parallel element P which may be a magnetic or electrostatic storage device.

The functioning of the device of Figure 3 can be best understood in connection with the wave forms of Figure 5. The wave forms of the two sources of power pulses are illustrated at the top of this figure, below which appears the serial signal on the input 20. For purposes of illustration it is assumed that there are three pulses 70, 71 and 72 appearing on the input signal at time periods T3, T7 and T9. It follows that the wave form on wire 35 will be as shown in Figure 5. Since there is no pulse on the input at time period T1, the next power pulse PP–1 will pass through amplifier 30 and create a pulse on wire 35 at time period T2. Since there is a pulse 70 on the input at time period T3, the amplifier 30 will be blocked during period T4 and no pulse will appear on wire 35 during that time period. Since there is no input signal at time period T5, the next power pulse will pass through amplifier 30 at time period T6 and will appear on wire 35 at that time. In view of pulses 71 and 72 appearing on the input at time periods T7 and T9, power pulses will be blocked by amplifier 30 during time periods T8 and T10. Hence the next pulse on wire 35 will be at time period T12. There will be pulses in output 36 conforming to each one of power pulses PP–2, except at time intervals immediately following pulses on wire 35. Hence there is no pulse at output 36 at time T1, none at time T3, one at T5, none at T7, but a pulse appears at each of time periods T9 and T11.

There will be pulses on wire 37 coming from source PP–1, except during those intervals immediately following pulses on output 36. Hence the wave form shown in Figure 5, for wire 37, results. At output 38 there will be pulses conforming to those of source PP–2 at all times except those intervals immediately following pulses on wire 37. Hence the wave form shown for output 38 results (see Figure 5). Pulses will appear on wires 39, 41 and 43 conforming to power pulses from the source PP–1, except where a pulse appeared in the output of an immediately preceding amplifier at a time interval immediately preceding any given pulse in question. As a result the wave forms shown in Figure 5 for wires 39, 41 and 43 result. It is also true that source PP–2 will produce a pulse at outputs 40, 42 and 44, except during those intervals immediately following a pulse on the preceding wire (39, 41 or 43 as the case may be) at an immediately preceding time interval.

Since there was no input pulse at serial input 20, at time period T1, there was no pulse on output 44 at time period T11. In view of input pulse 70 at time period T3 there was an output pulse 70A at output 42 at time period T11. Since there was no input pulse on serial input 20, at time period T5, there was no output pulse on output 40 at time period T11. In view of input pulse 71 at time period T7, there was pulse 71A at output 38 during time period T11. Likewise input pulse 72 created output pulse 72A at output 36 during time period T11. It follows that there is a parallel output at time period T11 conforming to the serial signal on the input 20. Since the output wires 36, 38, 40, 42 and 44 are fed to the parallel store P, if the latter is arranged to record or store the pulses fed thereto at time period T11, it will record these pulses as parallel information. It is also noted that the same information that exists on output wires 36, 38, 40, 42 and 44 may be extracted at later time periods from subsequent amplifiers if there are enough amplifiers in cascade. For example, at time period T13 there are pulses on outputs 38, 40 and 44 which are the same as the pulses at time T11 on outputs 36, 38 and 42. Similarly, during the time period T13 no pulse is produced at output 42 because of the lack of a pulse at output 40 during time period T11.

Figure 4:
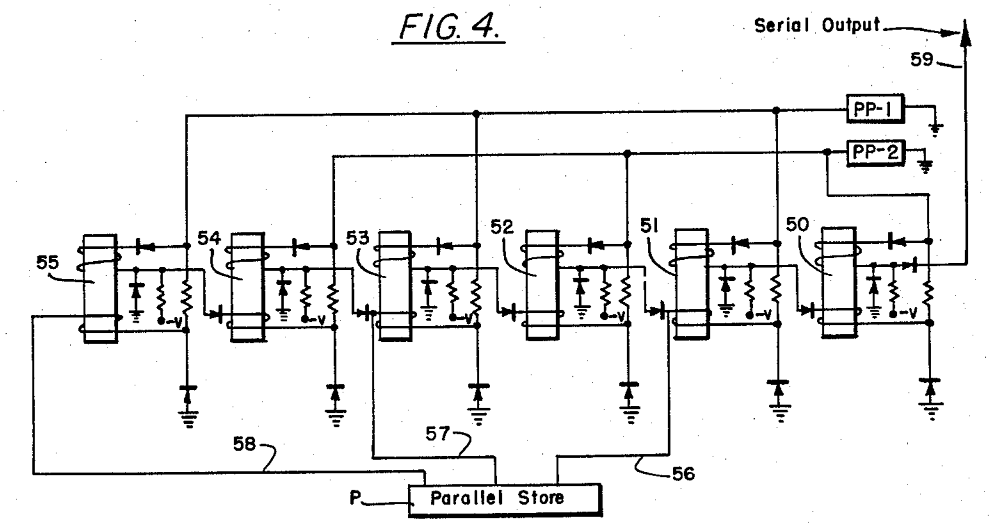
Figure 4 is a schematic diagram showing the connections employed when the device is used as a parallel to serial converter.

Figure 4 is a schematic diagram of a shifting register for converting information on the parallel store P to the serial output 59. Only a three-stage register, suitable for only three digits is shown, but additional stages for additional digits could be added according to the same principles. When it is desired to impress the parallel information in P upon the shifting register to thus get a serial output, necessary switches or gates in wires 56, 57 and 58 are closed, during a positive pulse from source PP–2, so that the aforesaid wires are respectively connected to the inputs of magnetic amplifiers 51, 53 and 55. Any pulse then present on wire 56 will be applied to the input of amplifier 51 during the period of one of the pulses PP–2 and will create an output pulse on wire 59 during the next power pulse PP–2.

Any pulse on wire 57 from the parallel store will be applied to the input of magnetic amplifier 53 during the occurrence of a pulse PP–2 and will produce an output pulse on wire 59 coincidental with the second pulse PP–2 occurring thereafter.

Any pulse appearing on wire 58 will be applied to the input of magnetic amplifier 54 during the period of a power pulse PP–2 and will create an output pulse on wire 59 during the period of the third power pulse PP–2 thereafter.

It follows that if pulses simultaneously are applied to wires 56, 57 and 58 during the period of one of the power pulses PP–2, there will be pulses in the output 59 at the intervals spaced by one, two and three power pulses (PP–2), after the application of the parallel signals to said wires.

One skilled in the art can see from reading the foregoing description and studying the circuit of Figure 4 that the system will act as a shifting register and will convert parallel information into serial information.

Figure 6:
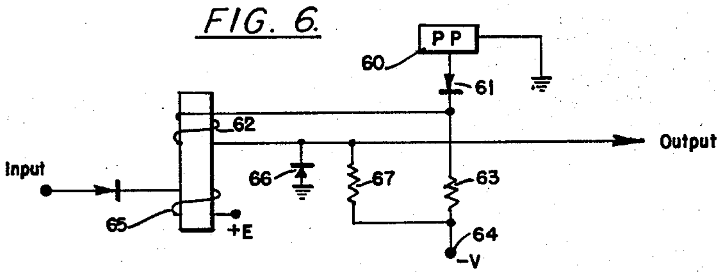
Figure 6 is a schematic diagram of a modified form of magnetic amplifier, known as a non-complementing one, that may be employed in connection with the invention.

The several forms of the invention hereinabove shown utilize complementing magnetic amplifiers. Non-complementing magnetic amplifiers may also be employed. The latter type of amplifier is one which has a pulse in its output only in event of a prior pulse on the input. Figure 6 is a schematic diagram of such an amplifier, which operates as follows:

The power pulses from source 60 are positive as in the previous case and pass through rectifier 61, coil 62, resistor 67, to negative pole 64 which is below ground potential. If we assume that at the start of the first pulse the core was at point 14 on its hysteresis loop (see Figure 2), it will be driven to point 15. At the end of this pulse, it will return to zero value 11. At the conclusion of the first pulse, current will flow in the following circuit: from ground through rectifier 66, coil 62, resistor 63 to negative pole 64. This is a current flow through coil 62 in the opposite direction from that of the first pulse and drives the core negatively from point 11 to point 13. At the conclusion of this reverse pulse, the second power pulse will again drive the core positively from point 13 through point 14 to point 15, and from thence it will go to 11, after the conclusion of the second pulse. The next action will be another flow of current in the following circuit: from ground through rectifier 66, coil 62, resistor 63, to negative pole 64. Hence, the magnetization of the core will repeatedly traverse the hysteresis loop and the majority of the time the core will be operating on unsaturated portions of the hysteresis loop, consequently there will be substantially no output. If, however, an input signal is received in coil 65, at a time when the core is at point 11, the reverse current (in circuit: ground—66–62–63–64) will not drive the core negatively to point 13 as usual. In such operation, there will be two opposing magnetizing forces in the core. That is, there will be a flow of current in the circuit: ground through rectifier 66, coil 62, resistor 63, to negative pole 64, tending to apply a negative magnetizing force to the cores and there will be an input current in coil 65 tending to apply a positive magnetizing force to the core. These two magnetizing forces will cancel each other and the core will remain at point 11 on the hysteresis loop. Consequently, the next power pulse will pass through rectifier 61 and coil 62 to the output. It will drive the core from point 11 to point 12 on the hysteresis loop. The core is substantially saturated throughout this entire period, and therefore a large pulse output will appear. The operation of non-complementing amplifiers may be summarized by stating that there will be current that will drive the core around the hysteresis loop without substantial saturation and therefore without any substantial pulse output until there is a current flow through coil 65. This will stop the alternating magnetizations of the core, allowing the next power pulse to saturate the core and give a large output.

Figure 7:
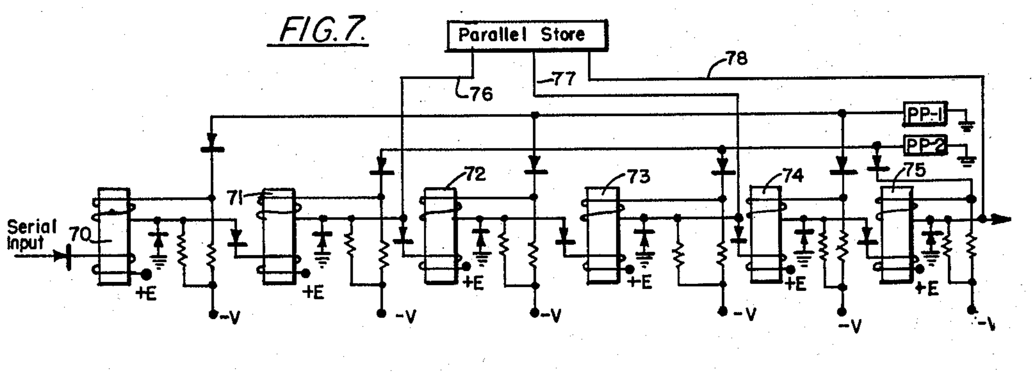
Figure 7 is a schematic diagram of a serial to parallel converter employing non-complementing amplifiers.

Figure 7 illustrates a serial to parallel converter employing non-complementing magnetic amplifiers. The operation is essentially the same as shown in connection with Figure 3, except that each magnetic amplifier 70 to 75 inclusive has a power pulse in its output one time period following any triggering impulse at its input. For example, if there is a serial input signal consisting of an impulse at time period T1 and no further impulses at subsequent time periods, the situation at time period T7 would be an output pulse on wire 78 (from amplifier 75) conforming to the pulse fed into the serial input. However, there would be no pulses on output leads 76 and 77 at time period T7. Hence, at time period T7 there would be a parallel output conforming to the serial input.

Figure 8:
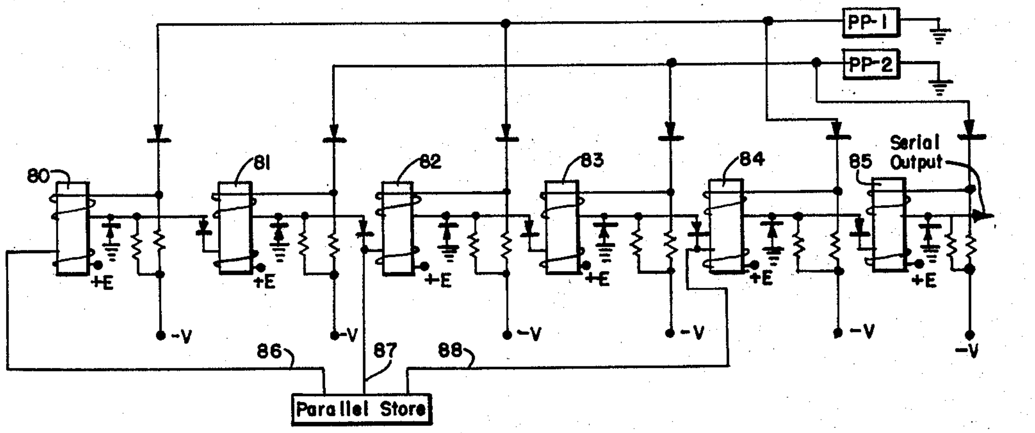
Figure 8 is a schematic diagram of a parallel to serial converter employing non-complementing amplifiers.

A parallel to serial converter utilizing non-complementing magnetic amplifiers is shown in Figure 8. This device operates in substantially the same way as the device of Figure 4, except that a pulse appears in the output of each magnetic amplifier only when a pulse was previously received on the input. However, by reasoning the same as that in conjunction with Figure 4, one skilled in the art may readily see that if parallel information is fed on wires 86, 87 and 88 to the inputs of amplifiers 80, 82 and 84 respectively, that a serial output corresponding to the parallel information will thereafter appear upon the output lead of magnetic amplifier 85.

Figure 9:
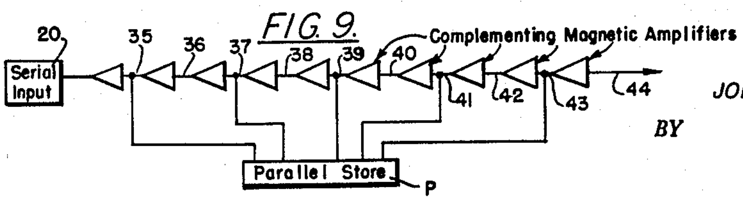
Figure 9 is a block diagram of a modified form of the invention.

It is further understood that in any of the forms of the invention it is possible to take parallel information from the odd numbered amplifiers instead of the even numbered amplifiers. For example, in Figure 3, information could be taken from wires 35, 37, 39, 41 and 43, instead of from wires 36, 38, 40, 42 and 44. In this case, the information on wires 35, 37, 39, 41 and 43 will be the complement of the serial input information from source 20. Such an arrangement is shown in the block diagram of Figure 9, where everything is identical with Figure 3 except the connections from the store P to the amplifiers. Similarly, in Figure 4 information from the parallel store P could be inserted into the amplifiers having cores 50, 52 and 54, instead of the amplifiers having cores 51, 53 and 55, in which case the serial output information on wire 59 is the complement of the information inserted from P. Entirely similar remarks apply to the devices of Figures 7 and 8, with the sole exception that no complementing of information occurs.

I claim to have invented:

1. A shifting register comprising a plurality of register stages connected in cascade, each of said stages comprising first and second magnetic amplifiers including a core of magnetic material capable of assuming stable remanence conditions and having power and input windings thereon, means coupling said power winding of the first amplifier in each stage in a series circuit with the input winding of the second amplifier in the same stage whereby the remanent condition of the second amplifier core in each stage is controlled by the output state of the first amplifier in the same stage, means coupling said power winding of the second amplifier in each stage in a series circuit with the input winding of the first amplifier in a succeeding stage whereby the remanent condition of said first amplifier core in each stage is controlled by the output state of the second amplifier in the preceding stage, means for supplying regularly spaced power pulses across said series circuits of each of said power windings, said power pulses being of alternately opposite phase for the power windings of successive ones of said amplifiers in said cascade connected stages, means for applying simultaneous input signals to the input windings of one of said amplifiers of each of said stages to change the remanent conditions of said cores of certain ones of said amplifiers accordingly whereby the remanent conditions of said cores of other ones of said amplifiers following said selected amplifier are changed accordingly during successive time periods, and means connected to said power winding of one of said amplifiers for deriving an output therefrom.

2. The combination of claim 1 wherein the first and second amplifiers in each of said stages both comprise complementing amplifiers whereby one of said amplifiers in each said stage tends to produce signals of one binary form and the other of said amplifiers in each said stage tends to produce signals of the other binary form.

3. A shifting register for a computer comprising means for producing first and second groups of spaced pulses with the pulses of the second group occurring in the spaces between the pulses of the first group, a plurality of magnetic amplifiers each comprising a magnetic core having two states of substantial saturation and a plurality of windings thereon, the odd numbered amplifiers being fed by said first pulse source and the even numbered amplifiers being fed by said second pulse source, each of said amplifiers controlling the power pulses fed thereto according to the degree of saturation of the core of said magnetic amplified during a time period immediately preceding the application of the power pulse to be controlled, each magnetic amplifier having a power winding fed at one end thereof by one of said pulse producing means, the other end of said power winding being the output of said amplifier and delivering output signals according to the impedance of said power winding which is determined by the saturation level of the core, each of said magnetic amplifiers also having a control winding fed by input signals which determine the saturation of the core and, thereby, the impedance of said power winding, said amplifiers being connected in cascade so that the output signals of each amplifier may be fed to the next amplifier as input signals by way of a series circuit which includes one of said pulse producing means, the power winding of the associated amplifier, and the control winding of the next amplifier, means including a component of a computing system having a plurality of circuits respectively connected to said control windings on different ones of said odd numbered amplifiers for applying parallel input information signals to said control windings, and means for suppressing the transmission of spurious pulses to adjacent amplifiers when a core is being driven through its unsaturated condition.

4. In a computing system, a circuit for converting parallel input information to serial output information comprising the combination of means for receiving said serial output information, means for supplying said parallel input information, a plurality of complementing magnetic amplifiers connected in cascade, each of said plurality of magnetic amplifiers including a core of magnetic material having two states of substantial saturation and power and control windings linked thereto, said serial output receiving means being fed by the last one of said plurality of magnetic amplifiers, means connecting said parallel input supplying means to the control windings of alternate ones of said amplifiers, means for passing a first train of spaced power pulses through the power winding of each odd numbered amplifier to the control winding of the next even numbered amplifier when the core of said odd amplifier is in one of said states of substantial saturation, and means for passing a second train of spaced pulses through the power winding of each even numbered amplifier to the control winding of the next odd numbered amplifier when the core of said even amplifier is in one of said states of substantial saturation, said pulses of said second pulse train occurring during the spaces between the pulses of said first pulse train.

5. A shifting register comprising a plurality of register stages, each of said stages comprising a pair of complementing magnetic amplifiers connected in series with one another whereby the first of said amplifiers in each of said pairs is operative in the absence of input signals to produce output signals which inhibit the production of output signals by the second of said amplifiers in each of said pairs, each of said complementing magnetic amplifiers comprising a core of magnetic material having a power winding and an input winding thereon, an energization source coupled to one end of each said power winding, means coupling the other end of each said power winding to the input winding of an adjacent amplifier, input means for selectively applying signals to selected ones of said first amplifiers in said stages to inhibit the production of output signals by selected ones of said first amplifiers, and means for deriving output signals from at least one of said second amplifiers.

6. A shifting register comprising a plurality of register stages, each of said stages comprising first and second complementing magnetic amplifiers connected in series with one another whereby the first of said amplifiers in each of said pairs is operative in the absence of input signals to produce output signals which inhibit the production of output signals by the second of said amplifiers in each of said pairs, each of said first and second complementing magnetic amplifiers comprising a core of magnetic material having a power winding and an input winding thereon, an energization source coupled to one end of each said power winding, means coupling the other end of each said power winding to the input winding of an adjacent amplifier, said energization source being coupled to the power windings of said first and second amplifiers comprising each stage such that each of said first and second amplifiers of said stage is energized by regularly spaced, out-of-phase, energization pulses respectively, input means for selectively applying signals to selected ones of said first amplifiers in said stages to inhibit the production of output signals by selected ones of said first amplifiers, and means for deriving output signals from at least one of said second amplifiers.

References Cited in the file of this patent

UNITED STATES PATENTS

| | | |
|---|---|---|
| 2,654,080 | Browne | Sept. 29, 1953 |
| 2,708,722 | An Wang | May 17, 1955 |
| 2,768,312 | Goodale | Oct. 23, 1956 |
| 2,784,390 | Chien | Mar. 5, 1957 |
| 2,825,890 | Ridler et al. | Mar. 4, 1958 |

OTHER REFERENCES

Electronics, January 1951, pp. 108–111.
Proc. IRE, April 1951, pp. 401–407.
Proc. Assoc. Comp. Mach., May 2, 1952, pp. 207–212.

UNITED STATES PATENT OFFICE

CERTIFICATE OF CORRECTION

November 8, 1960

Patent No. 2,959,770

John Presper Eckert, Jr.

It is hereby certified that error appears in the printed specification of the above numbered patent requiring correction and that the said Letters Patent should read as corrected below.

Column 6, line 41, for "amplified" read -- amplifier --.

Signed and sealed this 25th day of April 1961.

(SEAL)
Attest:

ERNEST W. SWIDER
Attesting Officer

DAVID L. LADD
Commissioner of Patents